(12) United States Patent
Carlsen

(10) Patent No.: US 12,202,581 B2
(45) Date of Patent: Jan. 21, 2025

(54) GRIPPER TOOL TO PERFORM MULTIPLE FUNCTIONS SUBSEA

(71) Applicant: OCEANEERING INTERNATIONAL, INC.

(72) Inventor: Torleif Carlsen, Sandnes (NO)

(73) Assignee: Oceaneering International, Inc., Houston, TX (US)

( * ) Notice: Subject to any disclaimer, the term of this patent is extended or adjusted under 35 U.S.C. 154(b) by 880 days.

(21) Appl. No.: 17/038,218

(22) Filed: Sep. 30, 2020

(65) Prior Publication Data

US 2021/0107611 A1    Apr. 15, 2021

Related U.S. Application Data

(60) Provisional application No. 62/909,040, filed on Oct. 1, 2019.

(51) Int. Cl.
*B63C 11/52* (2006.01)
*B25J 15/00* (2006.01)
*B25J 15/02* (2006.01)

(52) U.S. Cl.
CPC ........... *B63C 11/52* (2013.01); *B25J 15/0066* (2013.01); *B25J 15/0206* (2013.01)

(58) Field of Classification Search
CPC ... B63C 11/52; B25J 15/0066; B25J 15/0206; B25J 15/04; B25J 11/0055; B25J 11/0085; B63G 2008/004
See application file for complete search history.

(56) References Cited

U.S. PATENT DOCUMENTS

| | | | | |
|---|---|---|---|---|
| 4,793,053 A | * | 12/1988 | Zuccaro | B25J 15/04 901/41 |
| 4,897,014 A | * | 1/1990 | Tietze | B25J 15/0491 414/729 |
| 2009/0044655 A1 | * | 2/2009 | DeLouis | B25J 17/00 403/24 |
| 2009/0233774 A1 | * | 9/2009 | McCoy, Jr. | E21B 41/04 483/1 |
| 2015/0148949 A1 | | 5/2015 | Chin et al. | |
| 2016/0176043 A1 | * | 6/2016 | Mishra | B25J 15/0483 901/9 |
| 2017/0370173 A1 | | 12/2017 | Gable et al. | |
| 2019/0224858 A1 | | 7/2019 | Hansen et al. | |

(Continued)

*Primary Examiner* — Stephen A Vu
(74) *Attorney, Agent, or Firm* — Maze IP Law, P.C.

(57) ABSTRACT

A gripper multi-tool for an underwater vehicle comprises one or more mechanical gripper jaws; a motor; a torque controller operatively in communication with the motor; a cathodic protection (CP) probe disposed on at least one mechanical gripper jaw; a tool interface operatively connected to the motor and configured to selectively receive and/or discharge a tool selected from a plurality of tools; and a power source operatively in communication with the plurality of tools, the torque controller, and the motor. Gripper multi-tool is deployed subsea, such as via an underwater vehicle, and receives and engages a tool selected from a plurality of tools into the tool interface which, once engaged and effectuated, is used to perform a predetermined function. When the predetermined function has completed, the tool may be disengaged and removed from the tool interface and replaced with a further tool to perform a further function.

15 Claims, 3 Drawing Sheets

(56) References Cited

U.S. PATENT DOCUMENTS

2019/0263491 A1\* 8/2019 Cherami ................. G05D 1/10
2019/0308705 A1\* 10/2019 De La Torre Ugarte Del
                                 Castillo ............... B25J 11/0085
2020/0317311 A1\* 10/2020 Correll ................ B25J 19/0041

\* cited by examiner

GRIPPER TOOL TO PERFORM MULTIPLE FUNCTIONS SUBSEA

RELATION TO OTHER APPLICATIONS

This application claims priority through U.S. Provisional Application 62/909,040 filed on Oct. 1, 2019.

BACKGROUND

The use of conventional intervention tooling subsea is not optimal with respect to operation: conventional tooling performs only one primary task, which most often prolongs the operation time as most operations require multiple work performed. An example is cleaning with subsequent cathodic probe (CP) measuring: anodes or structural parts are cleaned, then CP probed, to assess the galvanic potential. Another example is light brush cleaning with subsequent valve operation; normal practice is to operate a cleaning tool with the manipulator, then put this away to free up the gripper for the upcoming valve turning.

When looking at Autonomous Work Vehicles (AWV), one or more subsea tool changer mechanisms will likely be required, but these AWV operations will be extremely limited if the AWV has to be retrieved topside for tool changeout. With subsea tool change out, whether using a piloted or autonomous vehicle, there is an operational challenge. There is also typically considerable risk linked to tool changeout due to the limited control of its environment. When an underwater vehicle such as an AWV needs to dock off/on a new tool, it will be forced back to a tool storing hub, where one form of mechanical contact is required, which might lead to the AWV being stuck or damaged.

FIGURES

Various figures are included herein which illustrate aspects of embodiments of the disclosed inventions.

DESCRIPTION OF EXEMPLARY EMBODIMENTS

The invention is useful with, but not limited to, subsea autonomous work vehicles (AWV) but may be used with standard remotely operated vehicles (ROV) and other subsea vehicles that need to perform subsea intervention work such as autonomous underwater vehicles (AUV).

Figure 1:
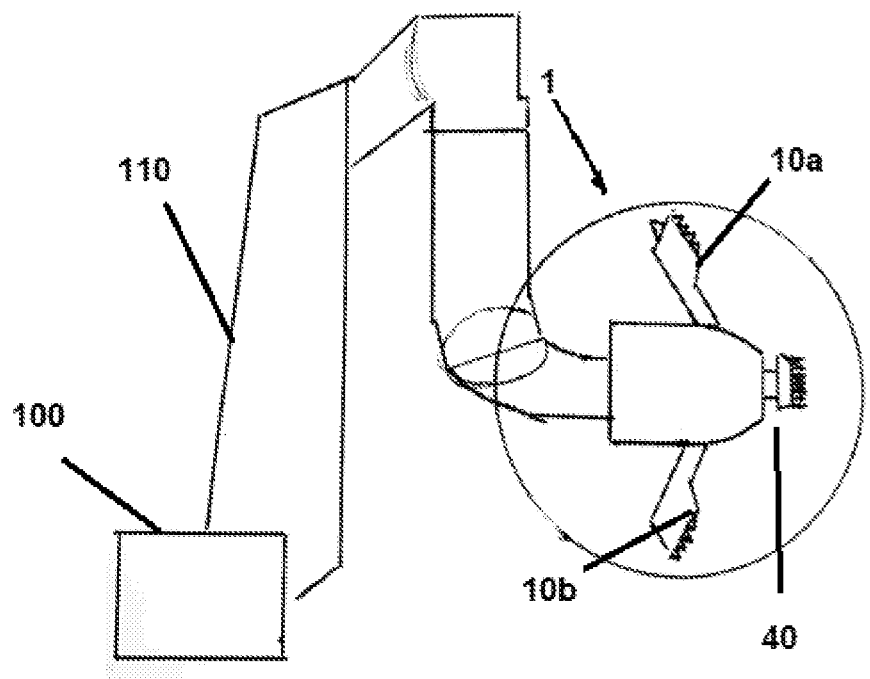
FIG. 1 is a block diagram of an embodiment of a gripper multi-tool used with a remotely operated vehicle.
Figure 2:
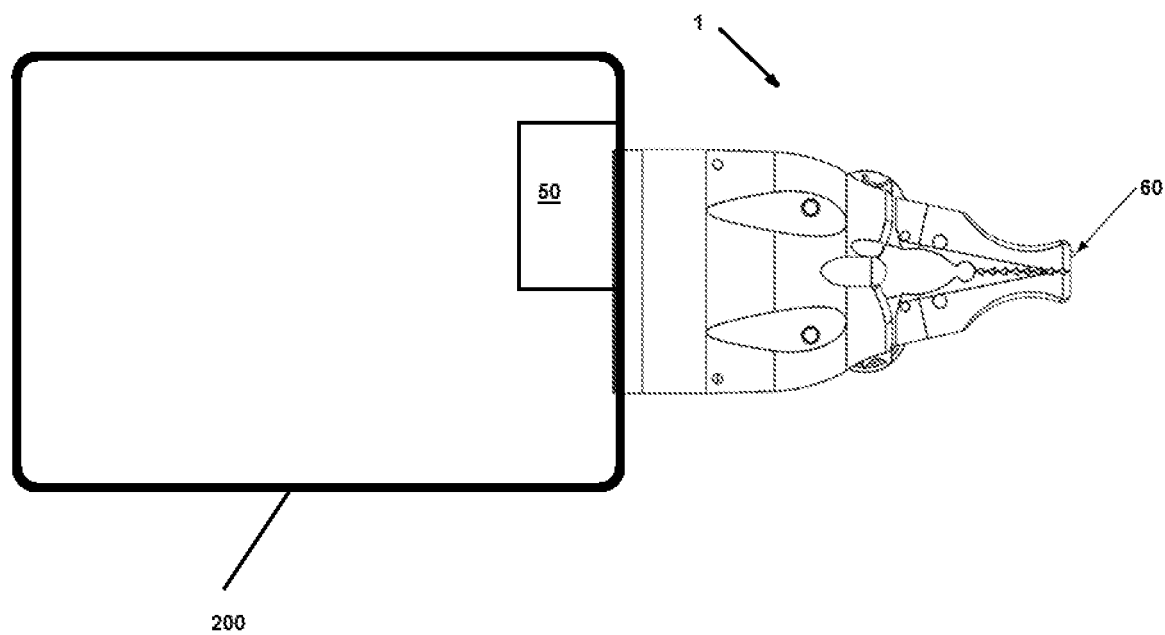
FIG. 2 is a block diagram of an embodiment of a gripper multi-tool used with an autonomous underwater vehicle.

In a first embodiment, referring generally to FIG. 1 and FIG. 2, gripper multi-tool 1 can be used by manipulator 110 operatively connected to standard intervention ROV 100 or docked on or to an autonomous underwater vehicle (AUV) or autonomous work vehicle (AWV) 200 (FIG. 2). Gripper multi-tool 1 may be used to enable performing multiple operations with the same tool, thus saving time, money and reducing operational risks.

Figure 3:
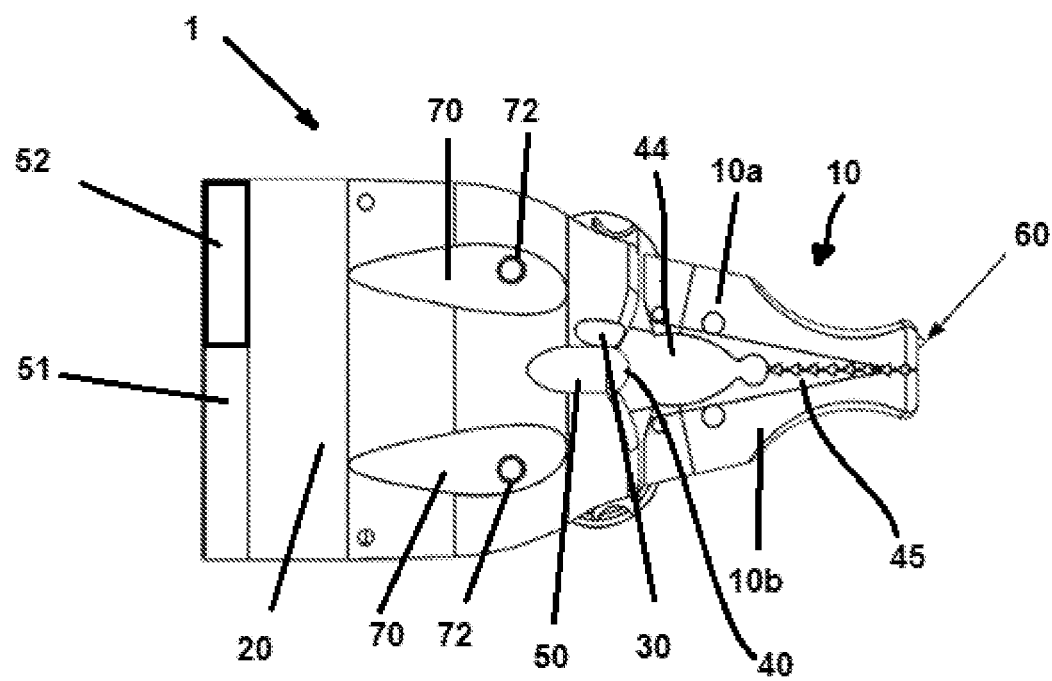
FIG. 3 is a plan view in partial perspective of an embodiment of a gripper multi-tool.

In embodiments, referring now to FIG. 3, gripper multi-tool 1 comprises one or more mechanical gripper jaws 10; one or more motors 20 operatively in communication with mechanical gripper jaws 10; one or more torque controllers 30 operatively in communication with motor 20 and operative on either or both of jaw force and rotary actuation torque; one or more cathodic protection (CP) probes 60, typically disposed on a furthest outer edge of at least one mechanical gripper jaw 10; tool interface 40 operatively connected to motor 20 and configured to selectively receive and/or discharge one or more tools 41 selected from a plurality of tools (generally referred to as callout "41" which is not shown in the figures but for which specific examples are illustrated as tool 43 (FIG. 4) and tool 42 (FIG. 5)), each tool 41 configured to perform a predetermined function from a set of predetermined functions; and one or more power supplies 50 (FIG. 2, FIG. 6) operatively in communication with the plurality of tools 40, torque controller 30, and motor 20.

In typical embodiments, mechanical gripper jaw 10 comprises a bifurcated set of opposing but cooperative mechanical gripper jaws 10a, 10b. In other embodiments, mechanical gripper jaw 10 comprises three or more opposing but cooperative mechanical gripper jaws.

In certain embodiment, motor 20 may comprise a variable speed motor which may be under the control of torque controller 30 and may further comprise one or more gears operatively with mechanical gripper jaws 10.

Figure 4:
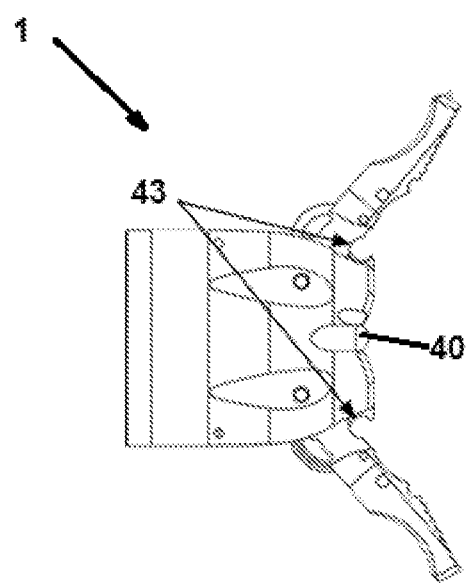
FIG. 4 is a plan view in partial perspective of an embodiment of a gripper multi-tool.
Figure 5:
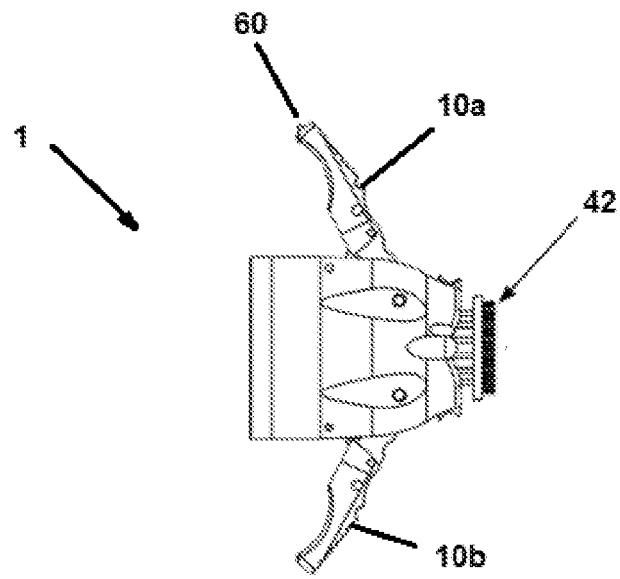
FIG. 5 is a plan view in partial perspective of an embodiment of a gripper multi-tool.

The predetermined function may comprise an intervention function and/or a cleaning function. In other embodiments, the predetermined function may comprise multiple functions and a plurality of tools 40 to perform these multiple functions. In embodiments, tools 41 comprise light touch cleaning tool 42 (FIG. 5) or softline cutter 43 (FIG. 4). In a further embodiment, tools 41 comprises guideline wire cutter 44 with feeder 45 that also serves as a super grinder. As noted above, tools 41 are configured to be selectively received and/or discharged by tool interface 40, e.g. such as where tool interface 40 comprises a ball detent or a similar catch/release mechanism.

Power source 50 (FIG. 2, FIG. 6) may comprise a hydraulic power source, an electric power source, a seawater-based fluid system power source, or the like, or a combination thereof and may be a power source internal (52) to the gripper multi-tool such as a battery or a power source external (50) to the gripper multi-tool such as one associated with ROV 100, AUV, or AWV 200. If external, power source 50 comprises power source interface 51. If present, the battery may be recharged via power source interface 51.

In certain embodiments, CP probe 60 comprises a soft touch CP probe.

Figure 6:
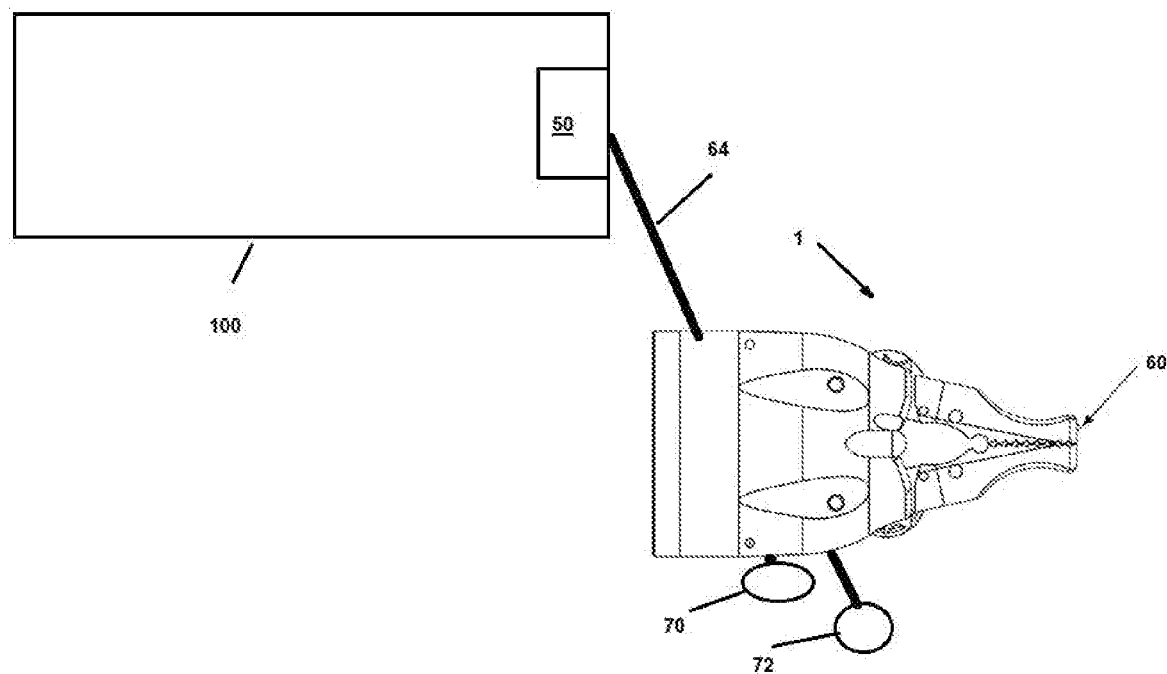
FIG. 6 is a further block diagram of an embodiment of a gripper multi-tool used with a remotely operated vehicle.

Referring additionally to FIG. 6, in embodiments one or more cameras 70 and/or lights 72 may be present, and power and comms link 64 may be present and operatively in communication with cameras 70 and/or lights 62. If present, cameras 70 and/or lights 72 are typically placed proximate to gripper jaw 10.

In certain embodiments, torque feedback may be obtained from gripper multi-tool 1 and manipulator 110, eliminating a need for an external clutch for torque control.

In the operation of exemplary methods, referring back to FIG. 3 gripper multi-tool 1 is deployed subsea, such as via an underwater vehicle (FIG. 1, FIG. 2), and receives and engages tool 41 into tool interface 40. Once engaged, tool 41 is effectuated by providing power to motor 20 and performing a predetermined function using tool 41. When performing the predetermined function has completed, tool 41 may be disengaged and removed from tool interface 40. If a further function is desired, a second tool 41 for accomplishing that further function can then be received and engaged into tool interface 40 and that further function then performed.

Gripper tool 1 is typically operatively connected to an underwater vehicle 100, 200. In these embodiments, where power source 50 comprises power source interface 51, power source interface 51 is typically operatively connected to the underwater vehicle which is then used to provide power to power source 50 via power source interface 51. Alternatively, or in combination with power source 50, power may be supplied using internal power source 52.

Accordingly, if tool 41 on ROV 200 or AWV 100 can perform multiple functions, operational time may be reduced using gripper multi-tool 1, e.g. it can minimize tool change-out time and cost. In these and other exemplary uses, gripper multi-tool 1 can therefore be used to accomplish multiple functions all with one gripper multi-tool 1, e.g. make a combined cleaning and seal replacement tool, allowing removal, cleaning, and inserting a new seal.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A gripper multi-tool for an underwater vehicle, comprising:
  a. a mechanical gripper jaw;
  b. a motor;
  c. a torque controller operative on both jaw force and rotary actuation torque, the torque controller operatively in communication with the motor;
  d. a cathodic protection (CP) probe disposed on the mechanical gripper jaw;
  e. a tool interface configured to selectively receive and/or discharge a tool selected from a plurality of tools, the tool interface operatively connected to the motor;
  f. a power source operatively in communication with the plurality of tools, the torque controller, and the motor; and
  g. an interface to a manipulator operatively connected the underwater vehicle, the underwater vehicle comprising an autonomous underwater vehicle (AUV), an autonomous work vehicle (AWV), or a standard remotely operated vehicle (ROV).

2. The gripper multi-tool for an underwater vehicle of claim 1, wherein each tool of the plurality of tools configured to perform a predetermined function from a set of predetermined functions.

3. The gripper multi-tool for an underwater vehicle of claim 2, wherein the plurality of tools comprises a light touch cleaning tool and a softline cutter.

4. The gripper multi-tool for an underwater vehicle of claim 1, wherein the tool interface comprises a catch/release mechanism.

5. The gripper multi-tool for an underwater vehicle of claim 1, wherein the power source comprises a hydraulic power source, an electric power source, or a seawater based fluid system power source.

6. The gripper multi-tool for an underwater vehicle of claim 1, wherein the power source comprises a power source internal to the gripper multi-tool or a power source external to the gripper multi-tool.

7. The gripper multi-tool for an underwater vehicle of claim 1, wherein, if the underwater vehicle comprises the AWV:
  a. the gripper multi-tool is further configured to be docked to the AWV;
  b. the AWV comprises a power supply; and
  c. the power source comprises the AWV power supply.

8. The gripper multi-tool for an underwater vehicle of claim 1, wherein, if the underwater vehicle comprises the standard ROV:
  a. the gripper multi-tool is further configured to be used by and operatively connected to the manipulator which is operatively connected to the ROV; and
  b. the power source comprises an ROV power supply.

9. The gripper multi-tool for an underwater vehicle of claim 1, wherein the predetermined function comprises intervention.

10. The gripper multi-tool for an underwater vehicle of claim 1, wherein the CP probe comprises a soft touch CP probe.

11. The gripper multi-tool for an underwater vehicle of claim 1, wherein the CP probe is disposed on a furthest outer edge of the mechanical gripper jaw.

12. The gripper multi-tool for an underwater vehicle of claim 1, wherein the mechanical gripper jaw comprises a plurality of mechanical gripper jaws.

13. The gripper multi-tool for an underwater vehicle of claim 12, wherein the plurality of mechanical gripper jaws comprises a bifurcated set of opposing but cooperative mechanical gripper jaws.

14. The gripper multi-tool for an underwater vehicle of claim 1, further comprising:
  a. a camera;
  b. a predetermined set of lights; and
  c. a power and communications link operatively in communication with the camera and the predetermined set of lights.

15. The gripper multi-tool for an underwater vehicle of claim 14, where the camera and predetermined set of lights are disposed proximate to the gripper jaw.

* * * * *